Aug. 22, 1967   E. H. BELK   3,337,268
HEADREST FOR VEHICLE SEAT
Filed March 21, 1966
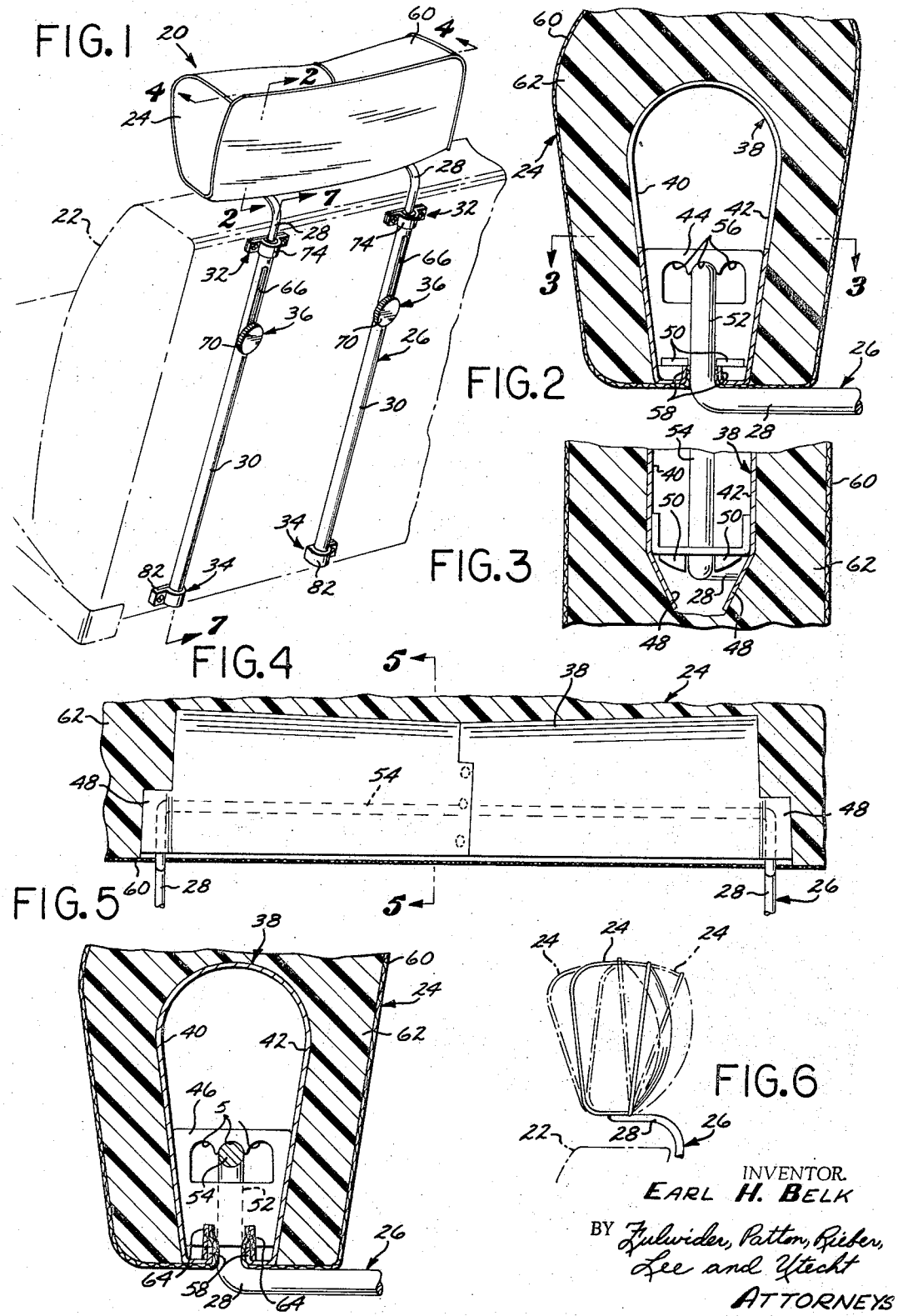
INVENTOR.
EARL H. BELK
BY Fulwider, Patton, Rieber,
Lee and Utecht
ATTORNEYS

United States Patent Office 3,337,268
Patented Aug. 22, 1967

3,337,268
HEADREST FOR VEHICLE SEAT
Earl H. Belk, 931 Long Beach Blvd.,
Long Beach, Calif. 90813
Filed Mar. 21, 1966, Ser. No. 535,827
3 Claims. (Cl. 297—400)

The present invention relates to a headrest for a vehicle seat, and more particularly to a headrest mountable adjacent the upper extremity of a vehicle seat to cushion the neck and head of the vehicle occupant and thereby provide protection in the event of an accident such as a rear end collision.

The forces developed upon the neck and head of a vehicle occupant during a rear end collision can be sufficiently great that the head is violently thrown backwardly to produce the soft tissue injury to the neck and adjoining areas commonly known as a "whiplash injury." These forces can be absorbed to a great extent by locating a bolster or headrest immediately behind the neck and head and attaching it to the vehicle seat. The headrest projects above the seat and tends to cushion and decelerate the mass of the head during a rear end collision. In this position the headrest is subject to considerable stress and must be securely mounted to the seat to prevent it from being torn loose. A rigid mounting would solve this problem, but the headrest must be vertically adjustable to conform to the stature of the user, and it should desirably also be adjustable in a fore-and-aft direction. Adequate protection is vital but passenger comfort is almost equally important.

In a vehicle collision, loose objects are converted into lethal projectiles and the headrest must not be subject to inadvertent separation from its support means, despite the desirability of providing for adjustability and easy installation.

Consequently, it is an object of the present invention to provide a headrest for a vehicle seat which is securely mounted to the vehicle seat in a manner which prevents violent separation from the seat during a collision, inadvertent separation due to improper use by the user, and which also is adjustable in location to provide a comfortable headrest during normal driving.

Another object of the invention is the provision of a headrest of the aforementioned character which is adjustable in a fore-and-aft direction by merely grasping and raising the headrest for repositioning, and yet which is normally resistant to collision-induced fore-and-aft movement.

A further object of the invention is the provision of a headrest of the aforementioned character which is relatively inexpensive to manufacture, rugged in construction, and adapted for use as original equipment or "aftermarket" equipment, that is, for installation on used vehicles, for example.

These and other objects and advantages of the present invention will become apparent from the following detailed description, when taken in conjunction with the appended drawings wherein:

FIG. 1 is a perspective view of a headrest structure, according to the present invention, installed on the back of a vehicle seat;

FIG. 2 is an enlarged cross-sectional view taken along the line 2—2 of FIG. 1;

FIG. 3 is an enlarged view taken along the line 3—3 of FIG. 2;

FIG. 4 is an enlarged view taken along the line 4—4 of FIG. 1;

FIG. 5 is an enlarged view taken along the line 5—5 of FIG. 4; and

FIG. 6 is a side elevational view of the headrest, the various fore-and-aft positions of the headrest being illustrated in dash-dot outline.

Referring now to the drawings, there is illustrated a headrest structure 20, according to the present invention. The structure 20 is shown mounted to the generally vertically oriented back 22 of a seat of the type commonly used in automobiles and the like. However, it will be apparent from the description hereinafter made that the structure 20 may also be applied or mounted to the seat structures of various other types of vehicles. In addition, the particular application for the structure 20 which is described herein is an attachment of the structure 20 to the rear face of the seat back 22. However, it will be apparent from the description which follows that the structure 20 may be installed as "original equipment" in newly manufactured vehicles, in which case certain components of the structure 20 would be located internally of outer surfaces of the seat back 22 as an integral and concealed part of the seat structure.

The headrest structure 20 comprises, generally, a transversely oriented bolster or headrest 24 superjacent the upper extremity of the seat back 22; a support structure 26 for the headrest 24 and which includes a pair of elongated, vertically oriented and transversely spaced apart support arms 28 mounted at their upper extremities to the headrest 24, and a complemental pair of elongated, vertically oriented support columns 30 telescopically cooperative with the arms 28; securement assemblies 32 and 34 mounting the upper and lower portions of the support structure 26 to the seat back 22; and clamp assemblies 36 which are operative to control and fix the positions of the support arms 28 relative to the support columns 30 to thereby adjust the vertical position of the headrest 24.

As best viewed in FIGS. 2 through 5, the headrest 24 includes a transversely extending central core 38 having a curvilinear upper portion from which depend front and rear panels 40 and 42. This congfiuration is defined by bending sheet material, preferably 26 gage sheet metal, into an inverted U-shape. The panels 40 and 42 extend laterally beyond the curved portion of the core 38 and these extensions are bent toward each other, as best viewed in FIG. 3. The bent extensions locate a pair of transversely spaced arm brackets 44 and 46 which fit between and adjacent the lower extremities of the inwardly divergent panels 40 and 42.

The brackets 44 and 46 are preferably made of sheet metal and include inwardly formed side flanges 48 which are spot-welded to the adjacent panels 40 and 42. In addition, the lower edge of each bracket 44 and 46 includes a pair of outwardly turned tabs 50 which are spaced apart to define an opening through which extends one of the support arms 28. In this regard, each arm 28 includes a vertical portion which extends down the seat back 22, a forwardly formed, substantially horizontal portion which projects over the upper end of the seat back 22, and a short vertical portion 52 which extends through the space between the tabs 50 of the associated one of the arm brackets 44 and 46.

The support arms 28 are integrally connected together by a transverse element or portion 54, as best viewed in FIG. 5, which constitutes an integral continuation of the arm vertical portions 52. By reason of the location of the portions 52, the lower end of the core 38, and consequently the headrest 24, is immovable in a fore-and-aft direction relative to the support arms. However, the headrest 24 is tippable in a fore-and-aft direction about a transverse axis generally coincident with the openings between the tabs 50 of the brackets 44 and 46, the openings being somewhat larger than the cross section of the arm vertical portions 52 for this purpose.

More particularly, each of the brackets 44 and 46 includes an opening characterized by an upper margin defining three adjacent curved edges or seats 56 each of which includes fore-and-aft portions or edge margins defining an entry throat therebetween which opens downwardly and each of which closely approximates the size of the round stock of which the transverse arm portion 54 is made. By grasping the headrest 24, moving it upwardly, and then tipping it in a fore-and-aft direction it is possible to locate the transverse arm portion 54 in one or the other of the seats 56 to thereby adjust the inclination of the headrest 24 to suit the user. The weight of the headrest 24 is sufficient to firmly seat the arm portion 54 in the selected seat 56, and it has been found that the headrest maintains this selected position under relatively high acceleration and deceleration forces.

Although not shown, it will be apparent that an obvious alternative structure to provide fore-and-aft adjustment of the headrest 24 is to eliminate the vertical arm portions 52 and the transverse arm portion 54 and instead provide a transverse rod (not shown) in the same position previously occupied by the portion 54, and weld or otherwise secure the ends of this transverse rod to the ends of the headrest 24 so that it is integral therewith. The arm brackets 44 and 46 are then demounted from the headrest 24 and made an integral part of the arms 28, as by welding or the like, and with the seats 56 located in or defined by the lower margins of the openings in the brackets 44 and 46. This is, in effect, a reversal of the parts illustrated in the drawings, with the headrest 24 and the transverse rod being tipped for adjustment relative to the arms 28 and the now stationary brackets 44 and 46 attached to the arms 28.

Coming back to the embodiment illustrated, the lower edges of the core panels 40 and 42 are bent or formed inwardly toward each other and then upwardly to form flanges 58 which define continuations of the openings between the tabs 50 for receiving the arm vertical portions 52. The flanges 58 engage and thereby aid in locating the arm brackets 44 and 46 in proper position, and also serve as retainers for flexible cloth or vinyl cover 60.

More particularly, the sheet metal headrest core 38 is covered by a layer of molded or otherwise shaped polyurethane foam material 62, and the cover 60 contains and overlies the material 62 to hold it in place. The hollow cover 60 is fabricated in any suitable fashion, as by cutting sections to the proper shape and assembling them with usual welting, and is characterized by a transverse slot in its lower side which is defined by a pair of opposed flaps having elongated, transversely extending strips 64 made of a stiff material such as pressed fibers or paper.

The cover 60 is tightly fitted over the foam material 62 upon the core 38 by drawing the cover 60 over and down upon the material 62 and tucking the strips 64 and their mounting flaps upwardly through the slot defined by the flanges 58. The strips 64 are then pressed downwardly into positions on the opposite sides of the flanges 58 to anchor the taut cover 60 in the position illustrated in FIG. 5.

The headrest 24 may be made in a variety of configurations, depending upon the shape of the core 38 and foam material 62 utilized, but the configuration illustrated is preferred. In this regard, the central portion of the core 38 is preferably rearwardl offset relative to the core ends, as best illustrated in FIG. 4, to better and more comfortably center the head of the user. This is done by appropriately cutting the core 38 in the middle, rearwardly displacing the several ends, and spot welding overlapping portions of the adjacent ends.

The sheet metal core 38 provides several important advantages over the prior art. It serves as a form to facilitate orientation of the foam material 62 and, by reason of the relatively great amount of hollow space it defines, greatly reduces the amount of relatively high cost foam material needed to form a headrest of adequate size. In addition, the sheet metal of the core progressively crushes under high acceleration forces to better cushion the usher's head. The foam material 62 provides a comfortable, cushioned pad for the head, but under extreme acceleration the sheet metal core 38 is needed for proper absorption of acceleration energy.

The elongated support arms 28 are preferably of circular cross section and made of good quality steel to withstand bending forces developed during rearward movement of the user's head against the headrest 24. The arms 28 telescopically extend into the hollow central openings in the U-shape columns 30, and are vertically adjustable relative to the columns 30. More particularly, each column 30 includes a vertically extending travel slot 66, as best viewed in FIG. 1, through which extends the threaded stud 68 of a clamping knob 70 constituting a part of the clamp assembly 36. The stud 68 is freely slidable in the slot 66 and is threaded into a threaded opening in the lower extremity of the associated support arm 26. By loosening the knobs 70, the support arms 29 may be moved vertically in the columns 30 to adjust the vertical position of the headrest 24. The knobs 70 are then tightened to maintain the adjusted position. However, it is important to note that the arms 28 are prevented from vertically separating from the columns 30 by reason of engagement between the studs 68 and the upper ends of the slots 66. Thus, it is impossible for inadvertent separation to occur, during a collision or otherwise, even if the knobs 70 are incompletely tightened.

It will be apparent that the cross sectional configurations of the arms 28 and columns 30 need not be circular and U-shape, but could, for example, be of channel-shape if desired.

The upper ends of each of the support columns 30 is fixed to the seat back 22 by an upper bracket 74 which forms a part of one of the securement assemblies 32. Each bracket 74 overlies its column 30 and includes lateral legs through which are disposed a pair of self-tapping metal screws. The screws extend into suitable openings provided in the framework of the vehicle seat back 22. In similar fashion, the lower end of each column is fixed to the seat back by a pair of metal screws which pass through a lower bracket 82 forming a part of one of the securement assemblies 34. The screws extend into a suitable pair of openings provided in the seat back framework.

From the foregoing, it will be apparent that a headrest structure has been provided which is adapted to withstand high acceleration forces without allowing inadvertent separation of the headrest from the seat back. Moreover, the vertically spaced points of attachment of the headrest structure to the seat back provide a structure highly resistant to backward bending and separation from the seat back, such as during a collision.

The headrest structure can be attached to already manufactured seat backs, or it can be incorporated within the seat back during manufacture thereof. This would merely require that the securement means for the headrest supporting structure be located internally of the seat back, and be capable of anchoring the supporting structure in this position.

Various modifications and changes may be made with regard to the foregoing detailed description without departing from the spirit of the invention or the scope of the following claims.

I claim:

1. In a headrest for a vehicle seat having a frame, the combination of:
   a headrest framework;
   support means for said headrest framework and including means adapted for association with the seat frame;

bracket means including a bracket having a plurality of seat portions arranged in a generally fore-and-aft direction, each of said seat portions having fore and aft portions defining an entry throat therebetween; and seating means including an element seatable within one of said seat portions for constraint against fore-and-aft movement by reason of engagement with said fore-and-aft portions, said element being movable in a substantially vertical direction through said entry throat for unseating and separation from said one of said seat portions whereby said element is freed to move in a fore-and-aft direction for seating within another one of said seat portions, one of said bracket and said seating means being fixed to said headrest framework and the other being fixed to said support means whereby relative vertical and fore-and-aft movement between said element and said seat portions is operative to adjust the fore-and-aft position of said headrest framework.

2. The combination of claim 1 wherein a pair of said brackets are provided in transversely spaced apart relation, and a pair of said seating means are provided for cooperation with said pair of said brackets.

3. The combination of claim 1 wherein said bracket is fixed to said framework and said seating means is fixed to said support means.

References Cited
UNITED STATES PATENTS

| | | | |
|---|---|---|---|
| 98,420 | 12/1869 | Safford | 297—410 |
| 3,084,978 | 4/1963 | Johansson | 297—397 |
| 3,159,426 | 12/1964 | Kerr | 297—408 |
| 3,159,427 | 12/1964 | Lawson | 297—410 |
| 3,184,207 | 5/1965 | Hermanns et al. | 248—413 |
| 3,205,005 | 9/1965 | Brown | 297—397 |

CASMIR A. NUNBERG, *Primary Examiner.*